(12) United States Patent
Ciepiel

(10) Patent No.: US 10,849,462 B2
(45) Date of Patent: Dec. 1, 2020

(54) DIAGNOSTIC SYSTEM WITH SOUND RECOGNITION

(71) Applicant: Vita-Mix Management Corporation, Olmsted Township, OH (US)

(72) Inventor: Anthony M. Ciepiel, Hudson, OH (US)

(73) Assignee: Vita-Mix Management Corporation, Olmsted Township, OH (US)

( * ) Notice: Subject to any disclaimer, the term of this patent is extended or adjusted under 35 U.S.C. 154(b) by 209 days.

(21) Appl. No.: 15/800,131

(22) Filed: Nov. 1, 2017

(65) Prior Publication Data

US 2018/0116467 A1 May 3, 2018

Related U.S. Application Data

(60) Provisional application No. 62/415,532, filed on Nov. 1, 2016.

(51) Int. Cl.
*A47J 43/08* (2006.01)
*A47J 43/044* (2006.01)
*A47J 43/042* (2006.01)
*A47J 43/046* (2006.01)
*A47J 43/07* (2006.01)
*A47J 36/32* (2006.01)
*B01F 15/00* (2006.01)

(52) U.S. Cl.
CPC ............ *A47J 43/08* (2013.01); *A47J 36/321* (2018.08); *A47J 43/042* (2013.01); *A47J 43/044* (2013.01); *A47J 43/046* (2013.01); *A47J 43/07* (2013.01); *A47J 43/0465* (2013.01); *B01F 15/00019* (2013.01)

(58) Field of Classification Search
CPC ............................. A47J 36/321; A47J 43/046
See application file for complete search history.

(56) References Cited

U.S. PATENT DOCUMENTS

2015/0305564 A1* 10/2015 Jimenez ................ A47J 43/046
366/141

* cited by examiner

*Primary Examiner* — Elizabeth Insler
(74) *Attorney, Agent, or Firm* — McDonald Hopkins LLC

(57) ABSTRACT

A blending system diagnoses a blending device. The blending system may include a diagnostic system that captures audio and diagnosis an issue of a blending device. The diagnostic system may compare the audio to reference audio. The comparison may match the audio with reference audio. The reference audio may be associated with diagnostic data. The diagnostic system may generate a diagnosis based on the match audio and associated diagnostic data.

8 Claims, 9 Drawing Sheets

DIAGNOSTIC SYSTEM WITH SOUND RECOGNITION

CROSS-REFERENCE TO RELATED APPLICATION

This application claims priority to U.S. Provisional Patent Application No. 62/415,532 entitled "DIAGNOSTIC SYSTEM WITH SOUND RECOGNITION," filed on Nov. 1, 2016, which is incorporated herein by reference in its entirety.

TECHNICAL FIELD

The present invention relates to a blending system and, more particularly, to a diagnostic system that diagnoses a blender device based on captured audio content.

BACKGROUND

Blenders and blending systems are often used to blend and process foodstuffs. Frozen, frosty, or icy drinks have become increasingly popular. Such drinks include the traditional shakes, and the more recently popular smoothies. Shakes, or milk shakes, are typically formed of ice cream and/or milk, and flavored as desired, with or without additives, such as candies, chocolates, peanut butter, fruits, etc. Milkshakes typically are available at most fast-food restaurants, such as burger chains, and may be made by special machines, or hand-made using mixers.

Smoothies tend to be healthier, and may be formed of ice, frozen yogurt, and/or sorbet. Smoothies may include additives such as fruits, fruit juice, vegetables, vitamins, supplements, etc. Smoothies typically are available from specialty chains or juice bars, and may be made with commercial or restaurant-grade blenders. Such drinks also may be made at home, using a personal blender.

Given the wide variety of uses for blenders, each blender may run into different technical issues that require very specific corrections to fix. However, it may be difficult for a user to diagnosis these issues. Therefore, a need exists for improved systems and methods for identifying issues with blending devices.

SUMMARY

The following presents a summary of this disclosure to provide a basic understanding of some aspects. This summary is intended to neither identify key or critical elements nor define any limitations of embodiments or claims. Furthermore, this summary may provide a simplified overview of some aspects that may be described in greater detail in other portions of this disclosure.

Described herein is a blender diagnostic system for diagnosing a blender that includes a memory to store instructions and a processor, communicatively coupled to the memory that facilitates execution of the instructions to perform operations. The operations include capturing audio from a blending device, analyzing the captured audio, and diagnosing the blending device based on the analysis. The system includes a microphone communicatively coupled to the processor. The capturing audio from the blending device comprises receiving, by the microphone, an acoustic sound signal emitted from the blending device by a microphone. The capturing audio from the blending device includes converting the acoustic sound signal into an electrical signal. In examples, the operations include generating an audio fingerprint that represents the captured audio. The diagnosing of the blending device comprises comparing the generated audio fingerprint to a reference audio fingerprint and identifying at least one match. The operations comprise receiving operating parameters associated with the blending device. The diagnosing of the blending device comprises diagnosing the blending device based at least in part on the operating parameters and the analysis of the captured audio. The system comprises at least one input device coupled to the processor. The input device operatively receives the operating parameters. The operating parameters comprise at least one of a make and model of the blending device, ingredients, quantities of the ingredients, settings of the blending device, or sensor information.

The diagnosing the blending device comprises at least one of: generating instructions associated with correcting an issue associated with the blending device or identifying the issue associated with the blending device and communicating the identified issue to a user. The diagnosing of the blending device also comprises prompting the user of at least one operating parameter. The processor may be comprised by at least one of a tablet, smartphone, wearable device, laptop, or desktop.

Described herein is a method of diagnosing an issue of a blending device. The method comprises capturing, by a system comprising a hardware processor, sound emitted from the blending device; analyzing, by the system, the captured sound; and diagnosing, by the system, the issue of the blending device based on the analysis of the captured sound. The method comprises receiving, by the system, data representing operating parameters associated with a blending process. The method comprises initiating, by the system, transmission of data identifying the issue to a network device. The method comprises monitoring, by the system, a history associated with a user account. The diagnosing the issue of the blending device comprises diagnosing the issue based at least in part on the analysis and the history. The method comprises determining, by the system, a match between the captured audio from the blending device and a reference audio signal. The reference audio signal may be associated with at least one known issue. The method comprises generating, by the system, a report describing the analysis of the captured sound and the diagnoses of the issue.

Described herein is a blender system. The blending system comprises a blender and a user device. The blender comprises a base housing a motor, a container operatively attached with the base; and a blade assembly operatively attached to the container. The user device comprises an input device that operatively receives at least one parameter associated with the blender. The user device generates a diagnostic for an issue associated with the blender based at least in part on the at least one parameter. The blender comprises at least one sensor that operatively senses the at least one parameter. The blender operatively transmits the at least one parameter to the user device. The at least one parameter comprises at least one of a temperature, run-time of the motor, blending program, ingredient, weight, or vibration information.

The following description and the drawings disclose various illustrative aspects. Some improvements and novel aspects may be expressly identified, while others may be apparent from the description and drawings.

DESCRIPTION OF THE DRAWINGS

The accompanying drawings illustrate various systems, apparatuses, devices and methods, in which like reference characters refer to like parts throughout, and in which.

DETAILED DESCRIPTION

Figure 1:
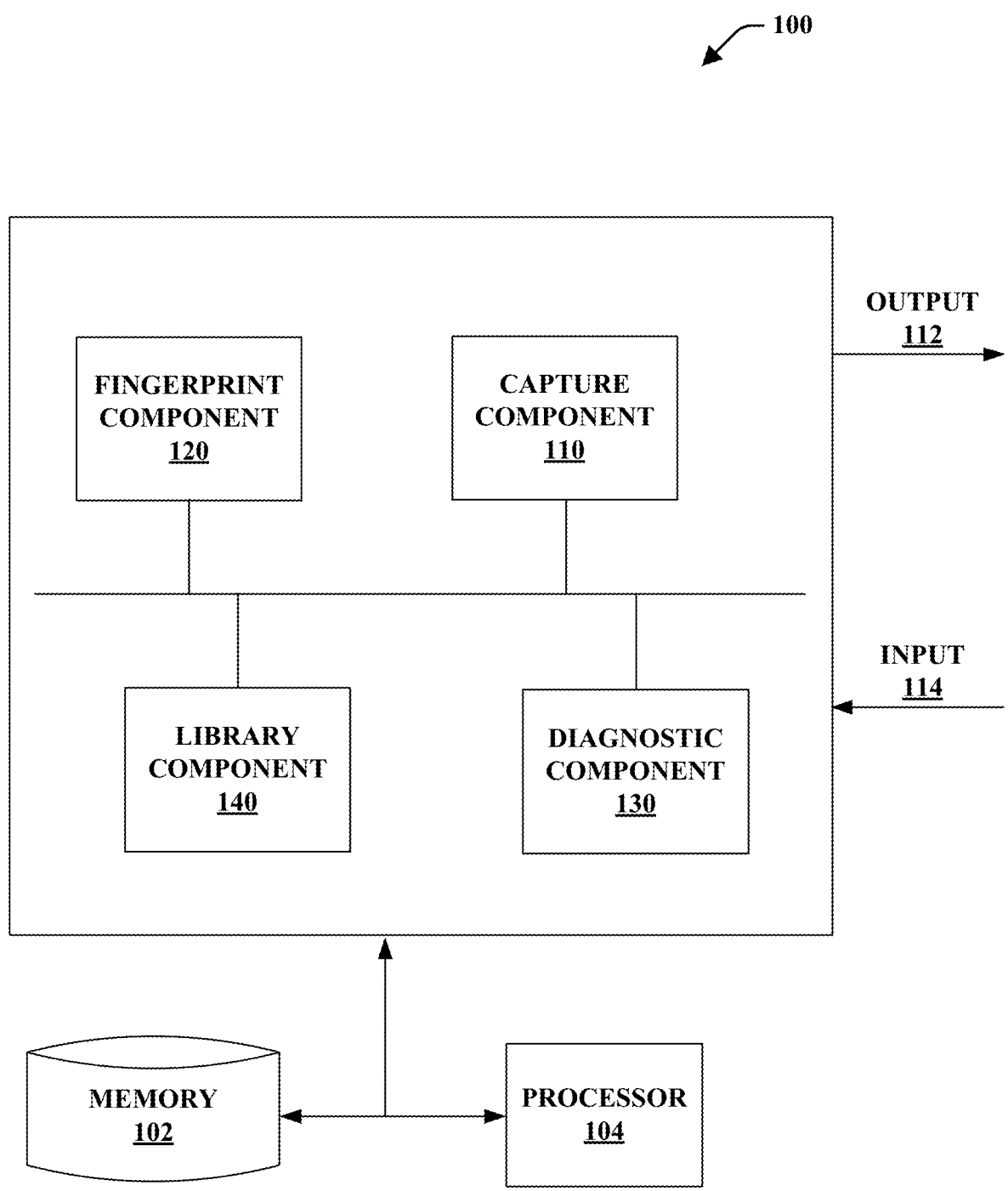
FIG. 1 is a functional block diagram of a diagnostic system in accordance with various embodiments described here.

Reference will now be made to exemplary embodiments, examples of which are illustrated in the accompanying drawings. It is to be understood that other embodiments may be utilized and structural and functional changes may be made. Moreover, features of the various embodiments may be combined or altered. As such, the following description is presented by way of illustration only and should not limit in any way the various alternatives and modifications that may be made to the illustrated embodiments. In this disclosure, numerous specific details provide a thorough understanding of the subject disclosure. It should be understood that aspects of this disclosure may be practiced with other embodiments not necessarily including all aspects described herein, etc.

As used herein, the words "example" and "exemplary" mean an instance, or illustration. The words "example" or "exemplary" do not indicate a key or preferred aspect or embodiment. The word "or" is intended to be inclusive rather an exclusive, unless context suggests otherwise. As an example, the phrase "A employs B or C," includes any inclusive permutation (e.g., A employs B; A employs C; or A employs both B and C). As another matter, the articles "a" and "an" are generally intended to mean "one or more" unless context suggest otherwise.

Moreover, terms such as "access point," "server," and the like, are utilized interchangeably, and refer to a network component or appliance that serves and receives control data, voice, video, sound, or other data-stream or signaling-stream. Data and signaling streams may be packetized or frame-based flows. Furthermore, the terms "user," "customer," "consumer," and the like are employed interchangeably throughout the subject specification, unless context suggests otherwise or warrants a particular distinction among the terms. It is noted that such terms may refer to human entities or automated components supported through artificial intelligence (e.g., a capacity to make inference). Still further, "user," "customer," "consumer," may include a commercial establishment(s), such as a restaurant, restaurant chain, commercial kitchen, grocery store, convenience store, ice-cream shop, smoothie restaurant, or the likes.

"Logic" refers to any information and/or data that may be applied to direct the operation of a processor. Logic may be formed from instruction signals stored in a memory (e.g., a non-transitory memory). Software is one example of logic. In another aspect, logic may include hardware, alone or in combination with software. For instance, logic may include digital and/or analog hardware circuits, such as hardware circuits comprising logical gates (e.g., AND, OR, XOR, NAND, NOR, and other logical operations). Furthermore, logic may be programmed and/or include aspects of various devices and is not limited to a single device.

A network typically includes a plurality of elements that host logic. In packet-based wide-area networks (WAN), servers (e.g., devices comprising logic) may be placed at different points on the network. Servers may communicate with other devices and/or databases. In another aspect, a server may provide access to a user account. The "user account" includes attributes for a particular user and commonly include a unique identifier (ID) associated with the user. The ID may be associated with a particular mobile device and/or blending device owned by the user. The user account may also include information such as relationships with other users, application usage, location, personal settings, and other information.

Embodiments may utilize substantially any wired or wireless network. For instance, embodiments may utilize various radio access network (RAN), e.g., Wi-Fi, global system for mobile communications, universal mobile telecommunications systems, worldwide interoperability for microwave access, enhanced general packet radio service, third generation partnership project long-term evolution (3G LTE), fourth generation long-term evolution (4G LTE), third generation partnership project 2, BLUETOOTH®, ultra mobile broadband, high speed packet access, $x^{th}$ generation long-term evolution, or another IEEE 802.XX technology. Furthermore, embodiments may utilize wired communications.

It is noted that, terms "user equipment," "device," "user equipment device," "client," and the like are utilized interchangeably in the subject application, unless context warrants particular distinction(s) among the terms. Such terms may refer to a network component(s) or appliance(s) that sends or receives data, voice, video, sound, or substantially any data-stream or signaling-stream to or from network components and/or other devices. By way of example, a user equipment device may comprise an electronic device capable of wirelessly sending and receiving data. A user equipment device may have a processor, a memory, a transceiver, an input, and an output. Examples of such devices include cellular telephones (e.g., smart phones), personal digital assistants (PDAs), portable computers, tablet computers (tablets), hand-held gaming counsels, wearables (e.g., smart watches), desktop computers, etc.

It is noted that user equipment devices can communicate with each other and with other elements via a network, for instance, a wireless network, or a wireline network. A "network" can include broadband wide-area networks such as cellular networks, local-area networks, wireless local-area networks (e.g., Wi-Fi), and personal area networks, such as near-field communication networks including BLUETOOTH®. Communication across a network may include packet-based communications, radio and frequency/amplitude modulations networks, and the like. Communication may be enabled by hardware elements called "transceivers." Transceivers may be configured for specific networks, and a user equipment device may have any number of transceivers configured for various networks. For instance, a smart phone may include a cellular transceiver, a Wi-Fi transceiver, a BLUETOOTH® transceiver, or may be hardwired. In those embodiments in which it is hardwired, any appropriate kind or type of networking cables may be utilized. For example, USB cables, dedicated wires, coaxial cables, optical fiber cables, twisted pair cables, Ethernet, HDMI and the like.

It is noted that the various embodiments described herein may include other components and/or functionality. It is further noted that while various embodiments refer to a blender or a blender system, various other systems may be utilized in view of embodiments described herein. For example, embodiments may be utilized in food processor systems, mixing systems, hand-held blending systems, various other food preparation systems, and the like. As such, references to a blender, blender system, and the like, are understood to include food processor systems, and other mixing systems. Such systems generally include a blender base that may include a motor, a controller, a display, a memory and a processor. Further, such systems may include a blending container and a blade assembly. The blade assembly, the blending container, and the blender base may removably or irremovably attach. The blending container may be powered in any appropriate manner, such as disclosed in U.S. patent application Ser. No. 14/213,557, entitled Powered Blending Container, which is hereby incorporated by reference. Foodstuff may be added to the blender container. Furthermore, while blending of "ingredients," "contents" or "foodstuffs" is described by various embodiments, it is noted that non-food stuff may be mixed or blended, such as paints, epoxies, construction material (e.g., mortar, cement, etc.), and the like. Further, the blending systems may include any household blender and/or any type of commercial blending system, including those with covers that may encapsulate or partially encapsulate the blender. Further, commercial blending systems may include an overall blending system, such as a modular blending system that may include the blender along with other components, such as a cleaner, foodstuff storage device (including a refrigerator), an ice maker and/or dispenser, a foodstuff dispenser (a liquid or powder flavoring dispenser) or any other combination of such.

As used herein, the phrases "blending process," "blending program," and the like are used interchangeably unless context suggest otherwise or warrants a particular distinction among such terms. A blending process may comprise a series or sequence of blender settings and operations to be carried out by the blending device. In an aspect, a blending process may comprise at least one motor speed and at least one time interval for the given motor speed. For example, a blending process may comprise a series of blender motor speeds to operate the blender blade at the given speed, a series of time intervals corresponding to the given motor speeds, and other blender parameters and timing settings. The blending process may further include a ramp-up speed that defines the amount of time the motor takes to reach its predetermined motor speed. The blending process may be stored on a memory and recalled by or communicated to the blending device.

Moreover, blending of foodstuff or ingredients may result in a blended product. Such blended products may include drinks, frozen drinks, smoothies, shakes, soups, purees, sorbets, butter (nut), dips or the likes. It is noted that various other blended products may result from blending ingredients. Accordingly, terms such as "blended product" or "drink" may be used interchangeably unless context suggests otherwise or warrants a particular distinction among such terms. Moreover, such terms are not intended to limit possible blended products and should be viewed as examples of possible blended products.

Aspects of systems, apparatuses or processes described herein generally relate to a diagnostic system for a blending or mixing system. In an embodiment, a diagnostic system may diagnose a blending device believed to be faulty or inoperable. The diagnostic system may include a capture component that may capture or otherwise receive an audio signal. For instance, the capture component may include and/or communicate with a microphone that may receive an audio signal. In another aspect, the diagnostic system may include a fingerprint component that may analyze captured audio and may generate a fingerprint representing the captured audio. The fingerprint may identify or represent interest points. A diagnostics component may compare the fingerprint to stored or reference fingerprints received from a library component. The comparison may identify one or more match pairs (e.g., generate fingerprint and one or more stored fingerprints). The library component may maintain stored fingerprints and diagnostic information associated with the stored fingerprints. In an aspect, the diagnostic component may generate a diagnosis of an issue based on the one or more matches.

In an example, a user may operate a blending system to blend foodstuff. During a blending process, a blending device may emit sound. The user may capture the sound via a user device. The user may also input operating parameters that define or describe the blending system, ingredients, a user's observations of a blending process, and/or a blending process. For instance, the user may identify a make/model of blending device, ingredients added, blending process selected, blender settings, or the like. A diagnostic system may identify an issue with the blending system and/or blending process based on the captured audio and/or the operating parameters. The diagnostic system may provide the user and/or a technician with diagnostic information, proposed solutions, instructions, or the like.

Referring now to FIG. 1, depicted is a block diagram of a functional diagnostic system 100 that may generate a diagnosis for a blending device. Diagnostic system 100 may primarily include a memory 102 and processor 104. Memory 102 may be configured to store computer executable components such as capture component 110, fingerprint component 120, diagnostic component 130, and library component 140. Processor 104 may facilitate operation of the computer executable components. It is noted that system 100 may include one or more devices, such as a user device and/or a blending device. It is further noted that one or more devices may comprise, at least in part, the various components. For instance, a single component of system 100 may be comprised by one or more devices (e.g., an end-user device, a technician device, etc.). While shown as separate or distinct components, the components of system 100 may be comprised by one or more components.

Figure 2:
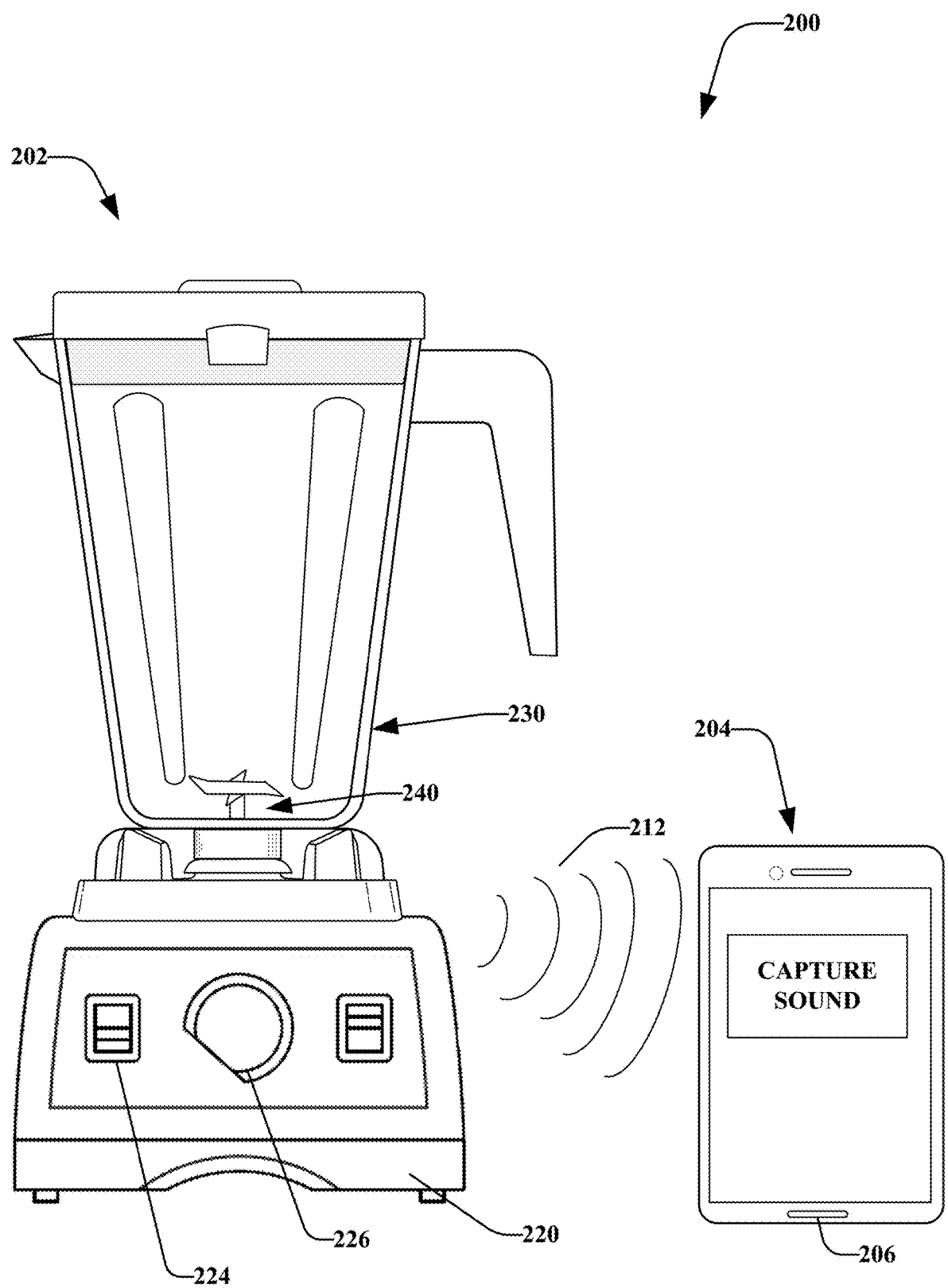
FIG. 2 is an environmental view of a diagnostic system in accordance with various embodiments described here.

Capture component 110 may monitor and capture audio signals. In at least one embodiment, capture component 110 may comprise a microphone, such as a microphone of a user device (e.g., a MEMS microphone). Turning now to FIG. 2 with reference to FIG. 1, there is a blending system 200 that may include a blending device 202 and a user device 204. It is noted that various components of the diagnostic system 100 may be comprised by the blending device 202 and/or the user device 204. In an example, capture component 110 may comprise microphone 206 of user device 204. The microphone 206 may receive and process audio signals 212 as input 114 from blending device 202 (e.g., via an airway or other carrier of a soundwave). The microphone 206 may include and/or be coupled to a transducer that transduces the received audio signals into representative electronic signals. It is noted that capture component 110 may utilize multiple microphones to improve reception and/or filter noise.

Blending device 202 may generate noise because of operation of a motor (not shown). The motor may be housed within a blender base 220. The blender base 220 may operatively engage with a blending container 230, and/or a blade assembly 240. A user may interact with one or more input devices (e.g., knob 226, switch 224, etc.) to provide input to operate the motor. The motor may be operatively engaged with the blade assembly 240, which may be disposed within the blending container 230. Operation of the motor may cause rotation of the blade assembly 240. In an example, a user may add ingredients to the blending container 230, and the blade assembly 240 may chop, blend, or otherwise process the ingredients. Operation of the blending device 202 may generally produce noise (e.g., audio signals 212) which may be captured by microphone 206.

In another aspect, capture component 110 may include a transducer that may convert captured audio signals to an electrical representation thereof. The electronic representation may be sent to (e.g., received by) the fingerprint component 120. Fingerprint component 120 may generate a fingerprint, spectrogram, or other representation of the received electronic signal. According to at least one embodiment, an entire spectrogram of audio captured from a blending process may include large amounts of data and may be difficult to process, such as for comparing spectrograms with each other. Thus, fingerprint component 120 may generate compact descriptors ("fingerprints") of captured audio. In an example, the fingerprint component 120 may generate a fingerprint that represents or identifies the captured audio signal. The fingerprint may include or describe information over a period of time, such as amplitude and/or intensity of a frequency at various times. It is noted that filters may be utilized to filter-out or remove certain frequencies from an audio signal. For instance, band-pass filters, or other filters may remove some sound generated by a motor (e.g., normal operating sounds), remove background noise (e.g., a user speaking), isolate frequencies (e.g., those most likely to help identify an issue), or the like.

In another aspect, the fingerprint may include a combination of frequency measurements over time. It is noted that various processes may be utilized to generate a fingerprint such as processes employing Fourier transforms, wavelet transforms, interest point recognition, or the like. Identifying or calculating an interest point may include identifying unique characteristics of fingerprints and/or audio signals. For instance, calculating fingerprints may include calculating interest points that identify unique characteristics of a time-frequency representation of captured audio. Fingerprints may then be generated as functions of sets of interest points. Interest points may include a spectral peak of a frequency over a period of time, timing of the onset of a frequency, or any suitable event over a duration of time.

Diagnostic component 130 may receive a generated fingerprint (or other representations of audio signals) and may compare the fingerprint to reference fingerprints stored and/or managed by library component 140. Library component 140 may include one or more reference fingerprints that may be associated with known issues, blending devices, or the like. For instance, a first reference fingerprint may comprise a representation of sound generated by a blending device having a clogged or obstructed air vent. A second reference fingerprint may comprise a representation of sound generated by a blending device having a motor that is not functioning at operative speed. Diagnostic component 130 may compare a generated fingerprint to reference fingerprints to identify an issue associated with a blending device.

In an embodiment, diagnostic component 130 may compare generated fingerprints with reference fingerprints to determine whether the generated fingerprints match a reference fingerprint. In an aspect, identifying a match may include determining a level of matching between two fingerprints. The level of matching may be a percentage, a scaled value (e.g., one to ten), or the like and may represent a likelihood or confidence of a match. For instance, a generated fingerprint may have a set of reference fingerprints to which it is matched. The set may comprise a number of reference fingerprints and associated match scores. In an example, a generated fingerprint may be matched to three reference fingerprints. Each pair of the reference fingerprints may have a match score identifying a level of matching. The diagnostic component 130 may select one or more of the reference fingerprints as a possible match. For example, the diagnostic component 130 may select a reference fingerprint associated with a highest match score, a set of reference fingerprints with match scores over a certain threshold (e.g., 90% match or above, etc.), or the like. The selected reference fingerprints may be associated with diagnostic information, such as possible issues, problems, solutions, and/or instructions. Diagnostic component 130 may be configured to communicate the diagnostic information (e.g., as output 112) to a user, technician, off-site support service, or the like. In another aspect, a user may be presented with possible issues and may select an issue/solution for their blender. This selection may be stored by the diagnostic component 130 and/or may be utilized to refine a diagnostic process.

In an example, the user may hold user device 204 next to or near the blending device 202. The user may initiate a listening or monitoring process by providing input to the user device (e.g., selecting "capture sound," "diagnose my blender," etc.). The user may additionally initiate a blending process, such as by pressing switch 224 and/or knob 226. The blending process and/or listening process may continue for a predetermined amount of time or a dynamically amount of time (e.g., user determined, when blending process ends, etc.). Once the process is complete, the user may be provided with a number of possible issues, possible solutions (e.g., links to order replacement parts, instructions on proper operation of the blending device 202, etc.), and/or instructions to provide additional input. As described here as well as elsewhere, diagnostic information may additionally or alternatively be sent to a technician, such as a maker or repairer of the blending device 202. The technician may be located in a disparate location as the user but may be able to provide the user with possible causes, solutions, or other information associated with an identified issue, such as via user device 204.

It is noted that the library component 140 may be pre-populated with a library of reference fingerprints, where each reference fingerprint is associated with one or more issues, solutions, or other diagnostic information. In an aspect, a provider and/or repair service may generate an initial list of known issues by capturing audio from blenders having known issues, improper use of a blender, or the like. For example, a technician may capture audio (e.g., via a device including a microphone) from a blending device that is overloaded with foodstuff. In another aspect, library component 140 may alter a library as users capture audio and/or as issues are identified. For instance, if a generated fingerprint does not match any reference fingerprint, then the fingerprint may be added to the library as a new issue. In an example, the user may send or otherwise provide the blender to a repair service. The repair services may inspect the blending device and identify an issue with the device. The repair service may associate the issue with the fingerprint, and library component 140 may store the associated issue and fingerprint in the library.

In at least one embodiment, the library component 140 may alter reference fingerprints and/or diagnostic data based on a history of diagnosing issues and/or user feedback. It is noted that library component 140 may make alterations manually (e.g., based on user input) and/or automatically. For instance, library component 140 (as well as other components of system 100) may utilize artificial intelligence, statistical models, or other processes and/or algorithms. In embodiments, library component 140 may utilize classifiers that map an attribute vector to a confidence that the attribute belongs to a class. For instance, library component 140 may input attribute vector, x=(x1, x2, x3, x4, xn) mapped to f(x)=confidence(class). Such classification can employ a probabilistic and/or statistical-based analysis (e.g., factoring into the analysis affinities and ingredient attributes) to infer/determine alterations to make to library entries or the like. In various embodiments, library component 140 may utilize other directed and undirected model classification approaches, e.g., naïve Bayes, Bayesian networks, decision trees, neural networks, fuzzy logic models, and probabilistic classification models providing different patterns of independence. Classification may also include statistical regression that is utilized to develop models to refine a library and/or diagnostic process.

In accordance with various aspects of the subject specification, an example embodiment may employ classifiers that are explicitly trained (e.g., via a generic training data) as well as implicitly trained (e.g., via manual diagnosis, blending information, user preferences, historical information, receiving extrinsic information). For example, support vector machines may be configured via learning or training phase within a classifier constructor and feature selection module. Thus, the classifier(s) may be used to automatically learn and perform a number of functions, including but not limited to matching fingerprints, diagnosing issues, altering (e.g., updating) library entries, and the like. This learning may be on an individual basis (e.g., based solely on a single user, blender, blender make/model, blending process) or may apply across a set of or the entirety of a base (e.g., a user base). Information from the users may be aggregated, and the classifier(s) may be used to automatically learn and perform a number of functions based on this aggregated information. The information may be dynamically distributed, such as through an automatic update, a notification, or any other method or means, to the entire user base, a subset thereof or to an individual user.

Figure 3:
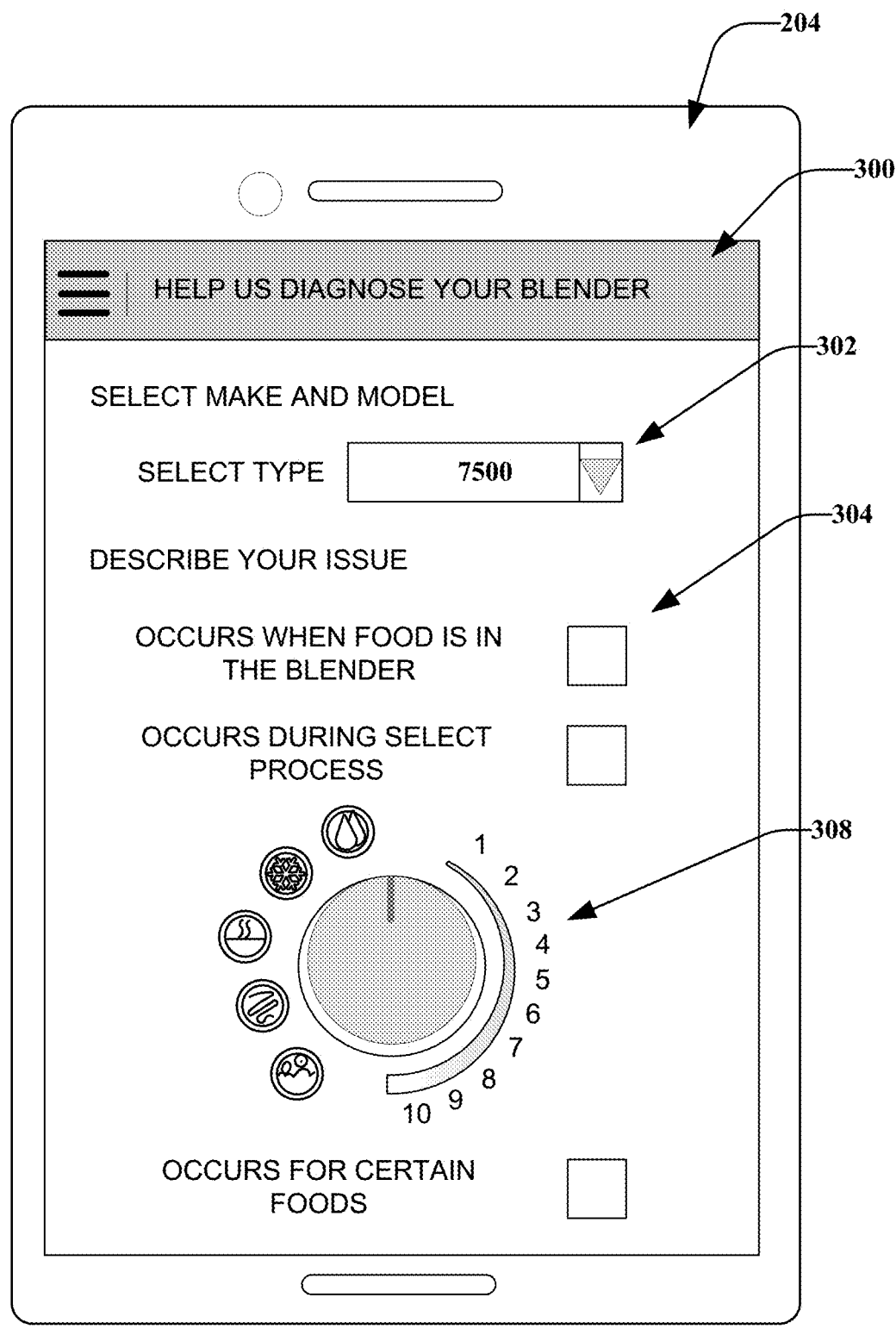
FIG. 3 is a diagram of an exemplary interface of a blending system in accordance with various embodiments described here.
Figure 4:
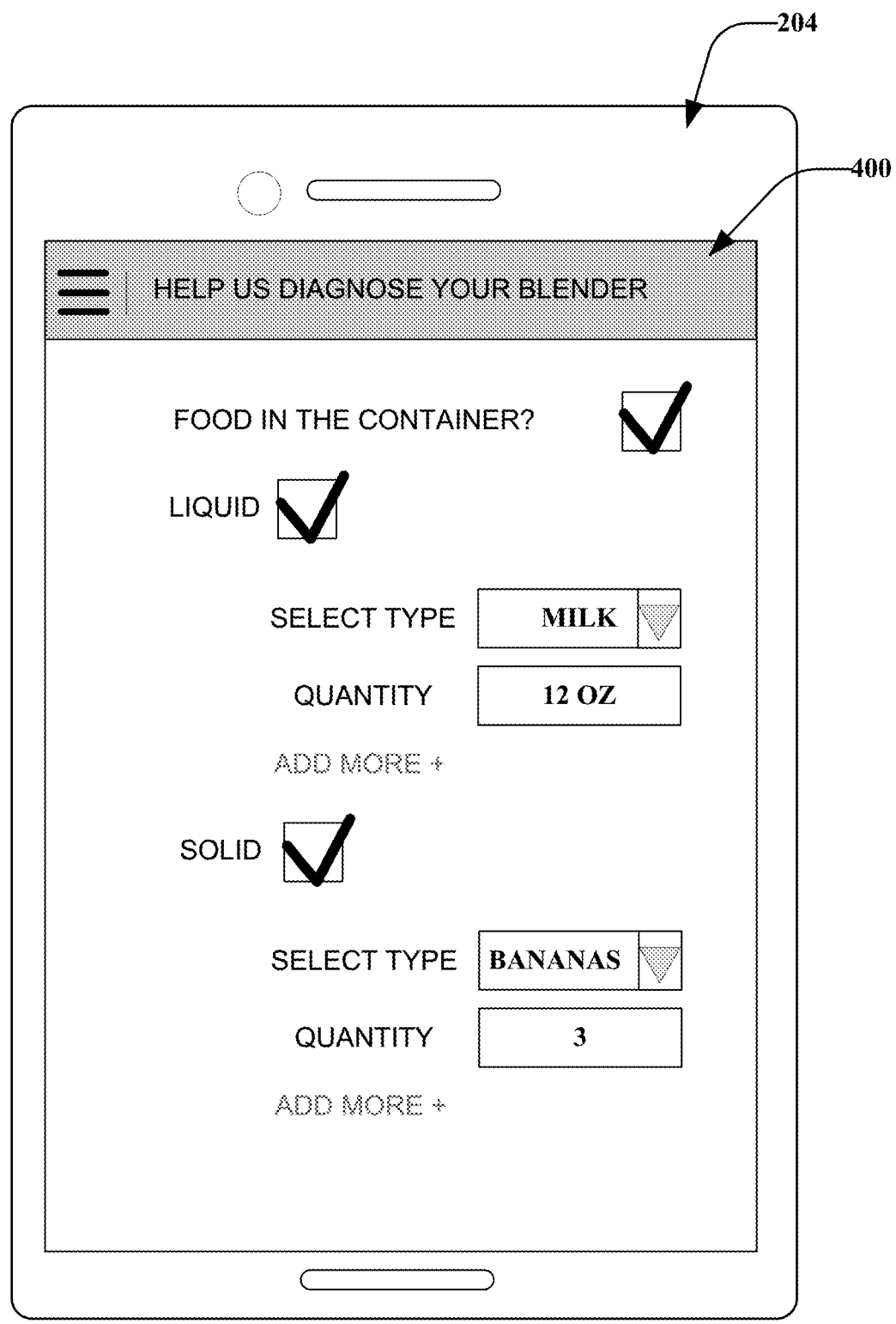
FIG. 4 is a diagram of another exemplary interface of a blending system in accordance with various embodiments described here.

According to an aspect of the present disclosure, diagnostic system 100 may associate a fingerprint (or interest points) with user acts, blending parameters, or the like. The association may alter (e.g., improve) accuracy of comparisons between generated fingerprints and reference fingerprints. In an example, a user may provide operating parameters and/or blending device parameters as user input (e.g., input 114). The user may interact with interface 300 and/or 400 of user device 204, as shown in FIGS. 3-4. In at least one embodiment, interface 300 may be configured to prompt a user and/or receive input from the user. Interface 300 may provide controls to receive a make and/or model of a user device, such as drop-down box 302. Blending process or operating parameters may be set via controls 304. According to an aspect, interface 300 may include a graphical representation of a blender input device, such as graphical knob 308. A user may rotate the graphical knob 308 to select a blending process that the user has selected via blending device 202. This may allow the user to easily input blending parameters. In an example, the graphical knob 308 may be rotated via a touch screen or other input mechanism. As shown in interface 400, a user may provide input associated with ingredients in the blending container 230. Prior to capturing audio, the user may select the ingredients that are input into the blending container 230 and/or quantities of the ingredients via desired user controls. It is noted that the types and/or quantities of the ingredients may be any appropriate type or quantity.

While a motor and/or blade assembly 140 is operating, a user may add additional ingredients, change blending speeds, pulse the motor, or the like. This may result in changes to audio signals generated by the blending device 202. In at least one embodiment, a user may provide diagnostic system 100 with a recipe that the user is following. This may allow diagnostic component 130 to associate variations in a fingerprint with user acts. Accordingly, the variations may be accounted for and/or compared to expected variations.

According to at least one embodiment, diagnostic system 100 may track or monitor user actions as a blending process is performed. Users may not follow a recipe and/or may not remember actions made during a blending process. In traditional systems, a user may need to provide a technician or repair person with details about a blending process. However, users do not always remember what actions were taken or when they were taken. Users may also inadvertently provide false information or not enough little information. Accordingly, diagnostic component 130 may track a blending process as the user is blending and/or recording audio. For instance, during the blending process, the user may change the speed of the motor via knob 226, add ingredients, or otherwise alter a blending process. At about the time (e.g., prior to, after, and/or generally currently) that a user performs an action, the user may appropriately change the speed of graphical knob 308 (and/or provide input identifying that an ingredient was added). Fingerprint component 120 may temporally associate this change of speed with a time point of a fingerprint. It is noted that there may be a time delay between when a user performs an action and when the user provides input indicating that an action was performed. For example, there may be a delay between when the user rotates knob 126 and graphical knob 308. To account for the delay, fingerprint component 120 may associate a period of time of a fingerprint with a user action. The period may be m seconds prior to and/or n seconds after rotation of the graphical knob 308, where m and n are numbers. The length of the period may be based on the action taken and/or ingredient added. Adding of water to the blending container 230 may have a smaller period than addition of a quantity of fruit, as the user may need to add the fruit in multiple actions.

It is further noted that blender base 220 may communicate with user device 204 via wireless and/or wired interfaces. For instance, blender base 220 and user device 204 may communicate via a wireless protocol (e.g., Wi-Fi, BLUETOOTH, NFC, etc.). The blender base 220 may transmit operating parameters to the user device 204. The operating parameters may include but are not limited to: a make/model of the blending device, sensor information (e.g., temperature, weight, vibration, etc.), information describing whether the blending device 200 is interlocked, information associated with a selected blending process, a motor speed setting, user input (e.g., user selections), or the like. It is noted that a blending system 200 may automatically determine and/or detect ingredients added to the blending container 230, quantities added, or the like.

According to at least one embodiment, entries in the library may be associated with operating parameters, such as types of ingredients, make/model of a blending device, or the like. When a user provides operating parameters, diagnostic component 130 may select reference fingerprints that match one or more of the operating parameters. The selected reference fingerprints may then be compared with a generated fingerprint to identify a match pair. Filtering the reference fingerprints based on operating parameters may allow for altered (e.g., improved) results, altered (e.g., decreased) latency, or the like. In at least one embodiment, diagnostic component 130 may utilize received operating parameters and/or a generated fingerprint to determine whether the user is appropriately operating the blending device.

In another aspect, the diagnostic component 130 may match the fingerprint with a reference fingerprint, without the user providing any operating parameters. For example, the user may capture audio without identifying a make/model, ingredients, or selected process. When a reference fingerprint matches the generated fingerprint, diagnostic component 130 may prompt the user for operating parameters. In response to receiving operating parameters, diagnostic component 130 may generate a diagnosis.

Figure 5:
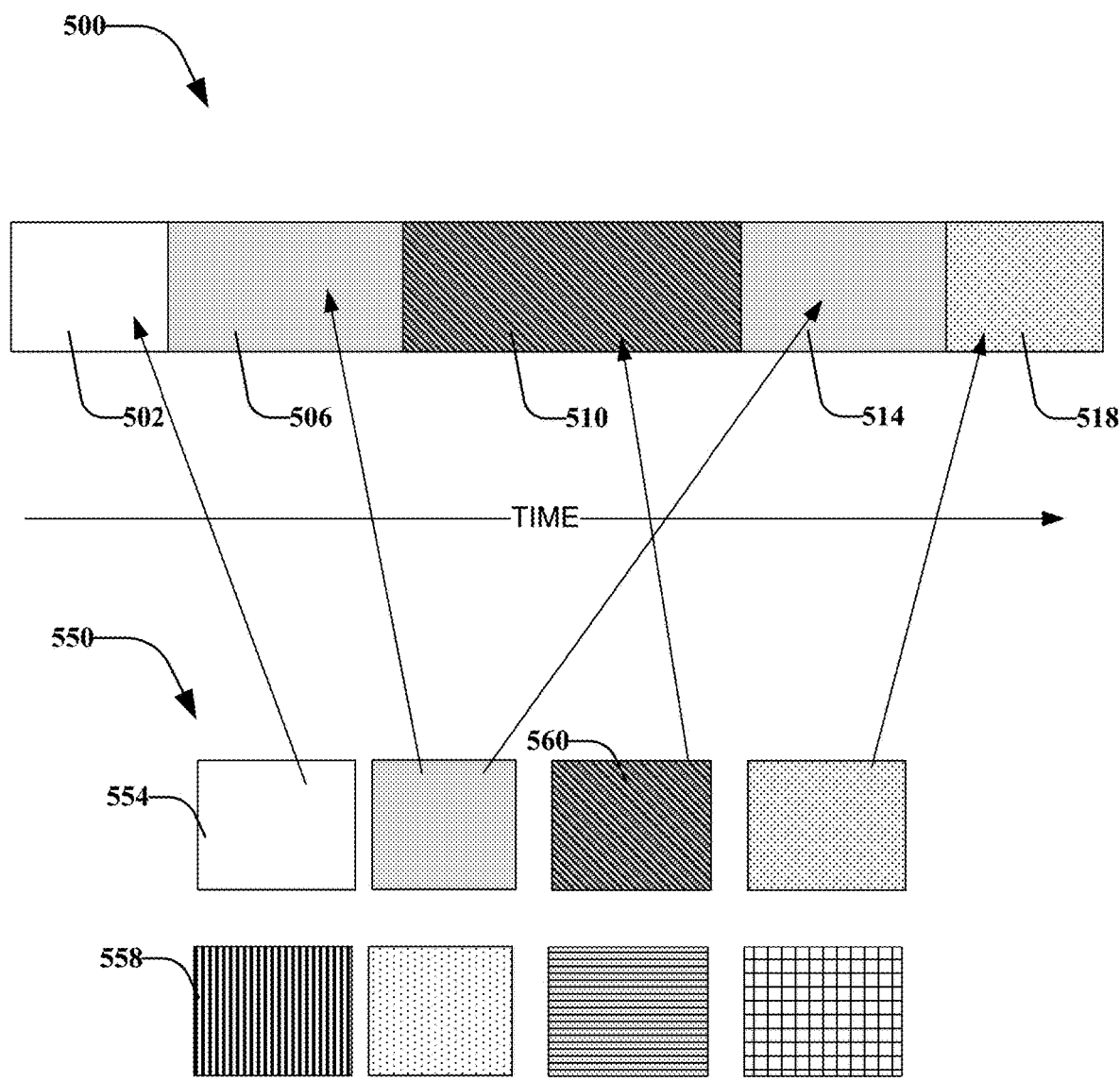
FIG. 5 is a diagram of an exemplary audio fingerprint and reference library in accordance with various embodiments described here.

Turning to FIG. 5, there is an exemplary graphical representation of a generated fingerprint 500. It is noted that the graphical representation is presented for purposes of explanation. In the fingerprint 500, a first portion 502 may be associated with a ramp-up of a blending device and a fifth portion 518 may be associated with a ramp-down period. A second period 506 and a fourth period 514 may be associated with generally similar frequencies and/or audio properties. The second period 506 and fourth period 514 may be separated by a third period 510. The third period 510 may represent an audio signal that is substantially different from the second or fourth periods 506/514. For instance, during the third period 510, a motor of a blending device may emit whining sounds or other sounds that are generally different from the second period 506 and/or fourth period 514. In an example, diagnostic component 130 may identify that the first and fifth portions 502/518 are associated with ramp-up and ramp-down, while the second period 506 and fourth period 514 are associated with normal operation sounds at a particular speed. In contrast, diagnostic component 130 may identify the third period 510 as emitting an irregular sound, such as due to the motor whining, losing power, or other issues.

As described above, the diagnostic component 130 may diagnose the issue based on matching fingerprint 500 with a reference fingerprint. For instance, diagnostic component 130 may match fingerprint 500 with a reference fingerprint associated with a blending process. In at least one embodiment, diagnostic component 130 may match fingerprint 500 with snippets or a series of fingerprints. In an example, a library may comprise a set of reference fingerprints 550. Each of the fingerprints may be associated with a particular event. For instance, reference fingerprint 554 may be associated with a "ramp-up" sound, fingerprint 558 may be associated with a sound of a blending device blending at a "high" setting, and the like. Fingerprint 560 may represent a "surge" sound from a blender. Diagnostic component 130 may determine that the surge sound should not normally occur in a blending process. Thus, it may determine that an issue exists. In an example, diagnostic component 130 may determine that the surge sound is associated with a known issue and/or possible issue. In another example, diagnostic component 130 may prompt the user to provide input identifying whether the user pressed a "pulse" button. If the user did press the pulse button, then the blending device may be operating normally. If the user did not press the pulse button, then the blending device may be acting improperly.

Diagnostic system 100 may utilize various techniques to identify issues based on captured audio and/or operating parameters. What has been described above are exemplary embodiments that may facilitate diagnosing of issues associated with blending devices. In view of the subject matter described herein, methods that may be related to various embodiments may be better appreciated with reference to the flowchart of FIG. 6. While the method is shown and described as a series of blocks, it is noted that associated methods or processes are not limited by the order of the blocks. It is further noted that some blocks and corresponding actions may occur in different orders or concurrently with other blocks. Moreover, different blocks or actions may be utilized to implement the method described hereinafter. Various actions may be completed by one or more of users, mechanical machines, automated assembly machines (e.g., including one or more processors or computing devices), or the like.

Figure 6:
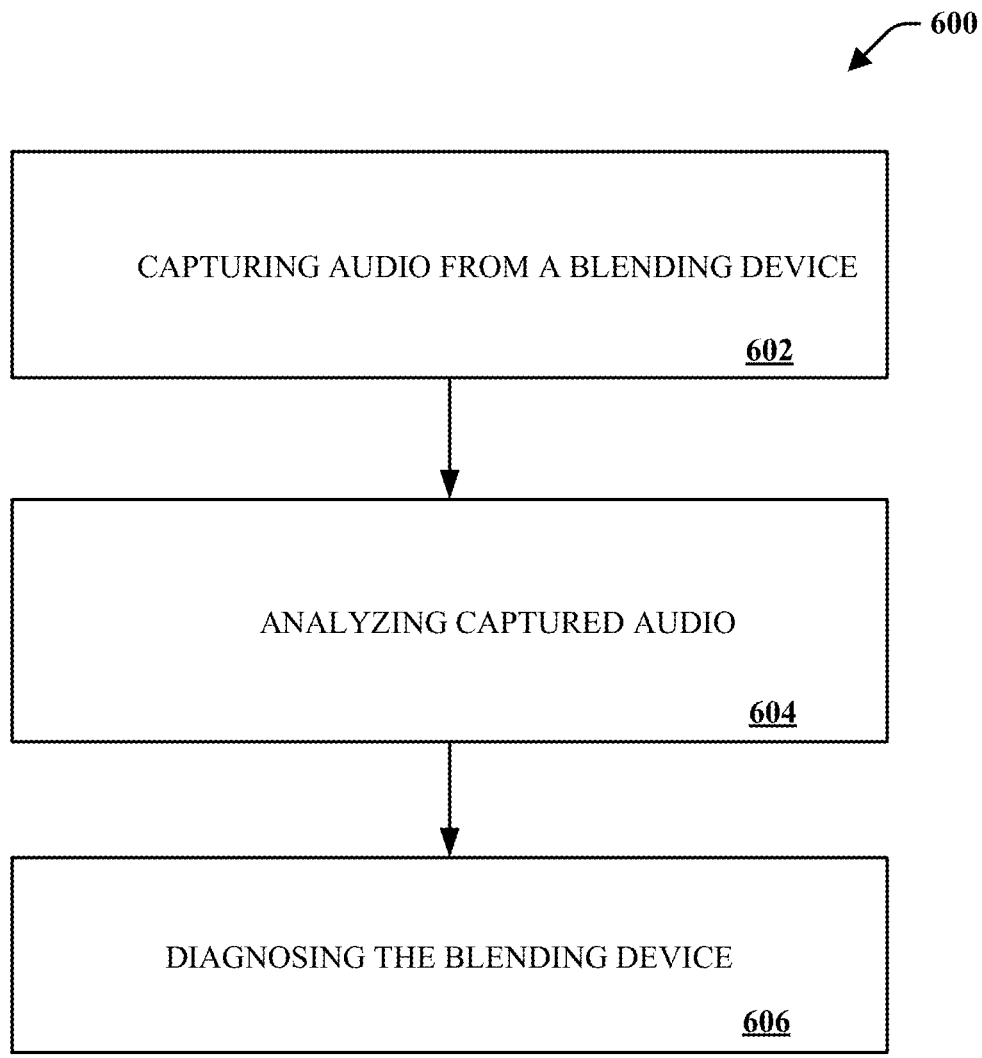
FIG. 6 is a flow diagram of an exemplary method associated with a blender system that may identify an ingredient and properties of the ingredient in accordance with various embodiments described here.

FIG. 6 depicts an exemplary flowchart of non-limiting method 600 associated with a blending system, according to various aspects of the subject disclosure. As an example, method 600 may analyze sound emitted from a blending device and may generate diagnoses based on the analyzed sound. At 602, the method 600 may include capturing, by a device comprising a processor (e.g., via capture component 110), an audio signal emitted from a blending device. For example, a user may utilize a smartphone or other device to capture sound during a blending process. Capturing sound may include receiving sound via a microphone, converting an acoustic sound signal into an electrical signal, and/or storing a representation of the sound.

At 604, the method 600 may include analyzing, by the system (e.g., via fingerprint component 120 and/or diagnostic component 130), the captured audio. For instance, captured audio may be converted into compact descriptors (e.g., a fingerprint) or the like. In another aspect, the captured audio may be compared to reference audio (e.g., reference fingerprints). It is noted that analyzing the reference audio may include analyzing operating parameters, such as operating parameters received from user input and/or the blending device.

At 606, the method 600 may include diagnosing, by the system (e.g., via diagnostic component 130), the blending device. It is noted that a system may utilize various algorithms or processes to diagnose the blending device, as described herein. For instance, diagnosing the blending device may comprise utilizing a statistical model that identifies a probable issue and/or cause based on analysis of captured audio and reference audio. In embodiments, diagnosing may include generating instructions, prompting a user for feedback, contacting a repair service provider, rendering an identified issue via a display device, or the like.

Figure 7:
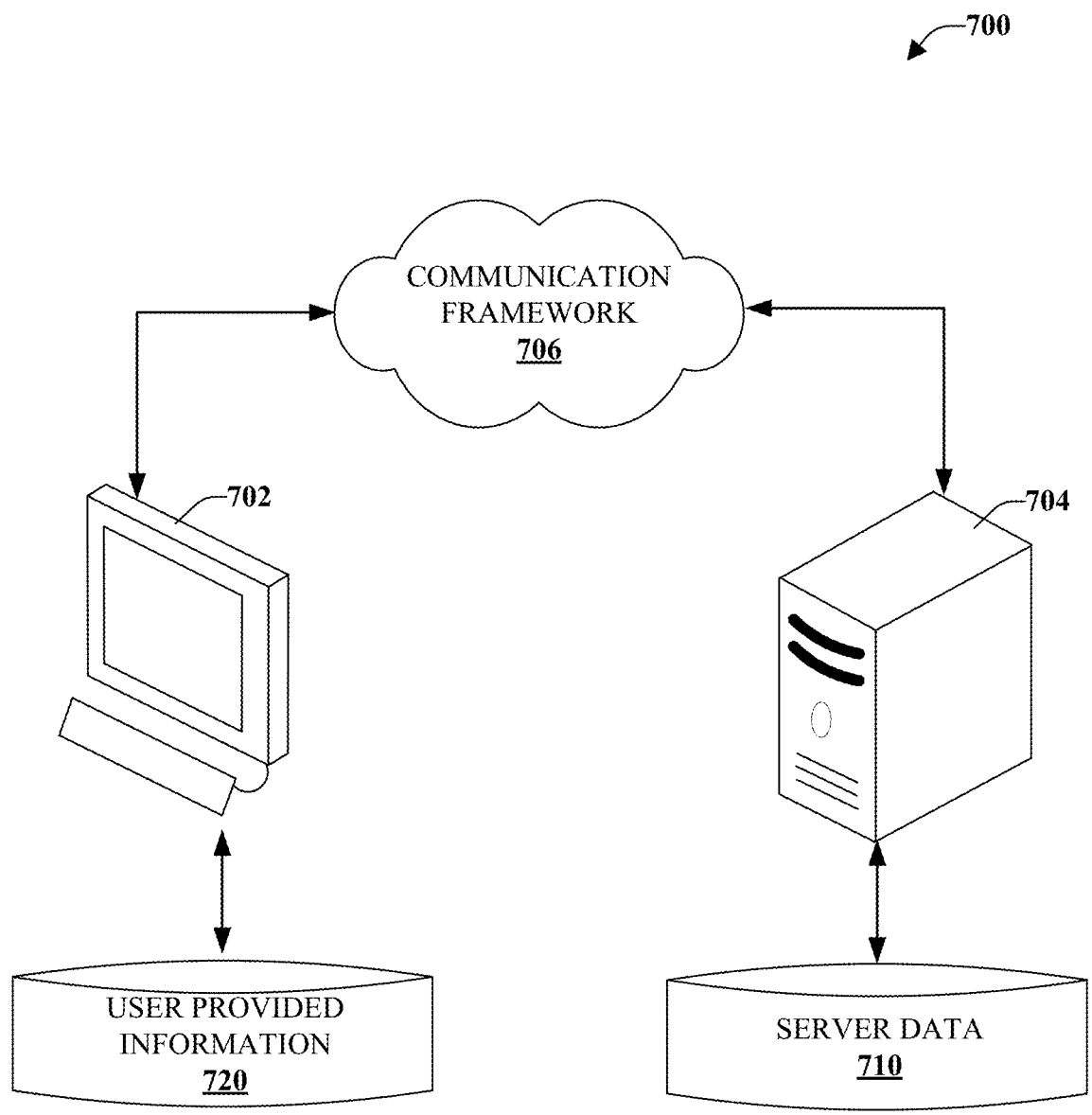
FIG. 7 is an environmental diagram of an exemplary communication system in accordance with various embodiments disclosed herein.
Figure 8:
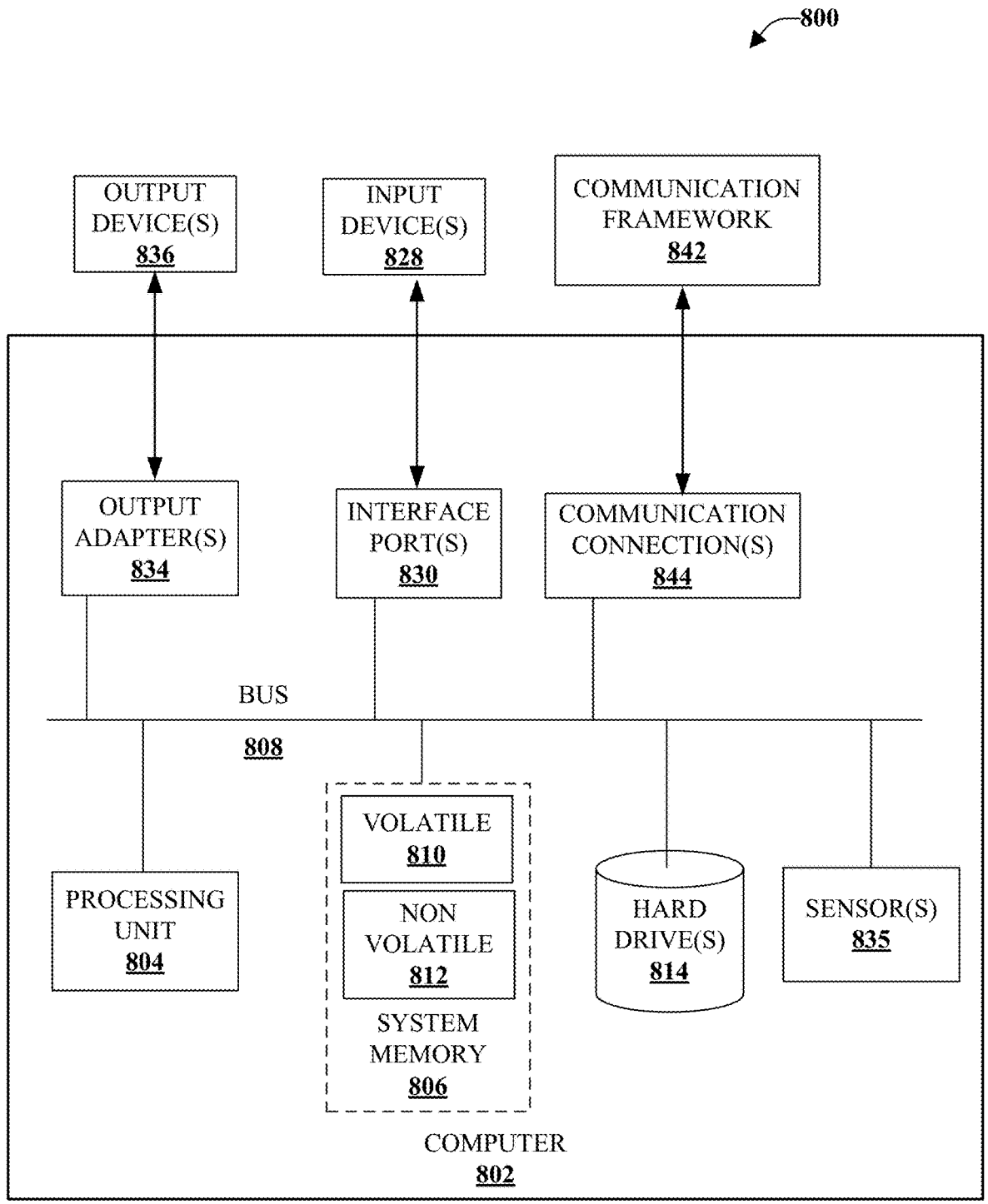
FIG. 8 is a block diagram of a functional computer system in accordance with various embodiments described here.

What has been described above may be further understood with reference to the following figures. FIGS. 7 and 8 provide exemplary operating environments or systems capable of implementing one or more systems, apparatuses, or processes described above. FIGS. 7 and 8 are not intended to limit the scope of such systems, apparatuses, or processes. By way of example, computing environment 700 may refer to one or more embodiment of the various embodiments described with reference to the above figures. However, variations to computing environment 700 may be obvious to achieve aspects or processes described herein.

FIG. 7 is a schematic diagram of a computing environment 700 in accordance with various disclosed aspects. It is noted that environment 700 may include various other components or aspects. As depicted, system 700 may include one or more client(s) 702, one or more server(s) 704, one or more client data store(s) 720, one or more server data store(s) 710, and a communication framework 706.

While depicted as a desktop computer(s), client(s) 702 may include various other devices that may comprise hardware and/or software (e.g., program threads, processes, computer processors, non-transitory memory devices, etc.). In an example, client(s) 702 may include laptop computers, smart phones, tablet computers, blending devices, wearables, etc.). The client(s) 702 may include or employ various aspects disclosed herein. For example, client(s) 702 may include or employ all or part of various systems (100, 200, etc.) and processes (e.g., method 600, etc.) disclosed herein.

Likewise, server(s) 704 may include various devices that may comprise hardware and/or software (e.g., program threads, processes, computer processors, non-transitory memory devices, etc.). Server(s) 704 may include or employ various aspects disclosed herein. For example, server(s) 704 may include or employ all or part of various systems (100, 200, 300, etc.) and processes (e.g., method 700, 800, 900, etc.) disclosed herein. It is noted that server(s) 704 and client(s) 702 may communicate via communication framework 706. In an exemplary communication, client(s) 702 and server(s) 704 may utilize packeted data (e.g., data packets) adapted to be transmitted between two or more computers. For instance, data packets may include coded information associated with blending processes, diagnostic information, or the like.

Communication framework 706 may comprise various network devices (e.g., access points, routers, base stations, etc.) that may facilitate communication between client(s) 702 and server(s) 704. It is noted various forms of communications may be utilized, such as wired (e.g., optical fiber, twisted copper wire, etc.) and/or wireless (e.g., cellular, Wi-Fi, near-field communication, etc.) communications.

In various embodiments, client(s) 702 and server(s) 704 may respectively include or communicate with one or more client data store(s) 720 or one or more server data store(s) 710. The data stores may store data local to client(s) 702 or server(s) 704.

In at least one embodiment, a client of client(s) 702 may transfer data describing a fingerprint, user account data, diagnosis, or the like to a server of server(s) 704. The server may store the data and/or employ processes to alter the data. For example, the server may transmit the data to other clients of client(s) 702.

FIG. 12 is a block diagram of a computer system 800 that may be employed to execute various disclosed embodiments. It is noted that various components may be implemented in combination with computer executable instructions, hardware devices, and/or combinations of hardware and software devices that may be performed by computer system 800.

Computer system 800 may include various components, hardware devices, software, software in execution, and the like. In embodiments, computer system 800 may include computer 800. Computer 800 may include a system bus 808 that couples various system components. Such components may include a processing unit(s) 804, system memory device(s) 806, disk storage device(s) 814, sensor(s) 835, output adapter(s) 834, interface port(s) 830, and communication connection(s) 844. One or more of the various components may be employed to perform aspects or embodiments disclosed herein. It is noted that one or more components of FIG. 8 may be comprised in different or other devices. For instance, the sensors(s) 835 may be disposed in a blender base or a user device. In an example, a blender base may include one or more of a temperature sensor, vibration sensor, or the like. The temperature sensor may sense parameters of the blender base, such as a temperature of a motor or temperature of other components. The blender base may communicate the sensed parameters to a user device (e.g., as input 114) and the user device may utilize the received input to diagnose an issue of the blender. In an aspect, the computer system 800 may "learn," such as described above user preferences based upon modifications of recipes by users, through rating of recipes both positively and negatively. For example, the computer system 800 may modify a particular fingerprint, diagnostic information, etc. (or a set thereof) as the majority of users or supermajority thereof have disapproved of the fingerprint, a diagnosis, or the like. The computer system 800 may dynamically push out the revised recipe or receive the revised recipe as applicable.

Processing unit(s) 804 may comprise various hardware processing devices, such as single core or multi-core processing devices. Moreover, processing unit(s) 804 may refer to a "processor," "controller," "computing processing unit (CPU)," or the likes. Such terms generally relate to a hardware device. Additionally, processing unit(s) 804 may include an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or the likes.

System memory 806 may include one or more types of memory, such volatile memory 810 (e.g., random access memory (RAM)) and non-volatile memory 812 (e.g., read-only memory (ROM)). ROM may include erasable programmable ROM (EPROM), electrically erasable programmable ROM (EEPROM). In various embodiments, processing unit(s) 804 may execute computer executable instructions stored in system memory 806, such as operating system instructions and the like.

Computer 802 may also be one or more hard drive(s) 814 (e.g., EIDE, SATA). While hard drive(s) 814 are depicted as internal to computer 802, it is noted that hard drive(s) 814 may be external and/or coupled to computer 802 via remote connections. Moreover, input port(s) 830 may include interfaces for coupling to input device(s) 828, such as disk drives. Disk drives may include components configured to receive, read and/or write to various types of memory devices, such as magnetic disks, optical disks (e.g., compact disks and/or other optical media), flash memory, zip drives, magnetic tapes, and the like.

It is noted that hard drive(s) 814 and/or other disk drives (or non-transitory memory devices in general) may store data and/or computer-executable instructions according to various described embodiments. Such memory devices may also include computer-executable instructions associated with various other programs or modules. For instance, hard drives(s) 814 may include operating system modules, application program modules, and the like. Moreover, aspects disclosed herein are not limited to a particular operating system, such as a commercially available operating system.

Input device(s) 828 may also include various user interface devices or other input devices, such as sensors (e.g., microphones, pressure sensors, light sensors, temperature sensors, vibration sensors, etc.), scales, cameras, scanners, facsimile machines, and the like. A user interface device may generate instructions associated with user commands. Such instructions may be received by computer 802. Examples of such interface devices include a keyboard, mouse (e.g., pointing device), joystick, remote controller, gaming controller, touch screen, stylus, and the like. Input port(s) 830 may provide connections for the input device(s) 828, such as via universal serial ports (USB ports), infrared (IR) sensors, serial ports, parallel ports, wireless connections, specialized ports, and the like. In an exemplary embodiment, the input device(s) 828 may be included in portions of a blending system. For example, sensors (e.g., temperature, vibration, weight, etc.) may be disposed in a blender base or a container. Computer 802 may receive input from the sensors and may diagnose the blender based at least in part on the received input. It is further noted that some input device(s) 828 may be included within a user device, such as a smart phone. As an example, a smart phone may include a microphone.

Output adapter(s) 834 may include various devices and/or programs that interface with output device(s) 836. Such output device(s) 836 may include LEDs, computer monitors, touch screens, televisions, projectors, audio devices, printing devices, or the likes.

In embodiments, computer 802 may be utilized as a client and/or a server device. As such, computer 802 may include communication connection(s) 844 for connecting to a communication framework 842. Communication connection(s) 844 may include devices or components capable of connecting to a network. For instance, communication connection(s) 844 may include cellular antennas, wireless antennas, wired connections, and the like. Such communication connection(s) 844 may connect to networks via communication framework 842. The networks may include wide area networks, local area networks, facility or enterprise wide networks (e.g., intranet), global networks (e.g., Internet), satellite networks, and the like. Some examples of wireless networks include Wi-Fi, Wi-Fi direct, BLUETOOTH™, Zigbee, and other 802.XX wireless technologies. It is noted that communication framework 842 may include multiple networks connected together. For instance, a Wi-Fi network may be connected to a wired Ethernet network.

Figure 9:
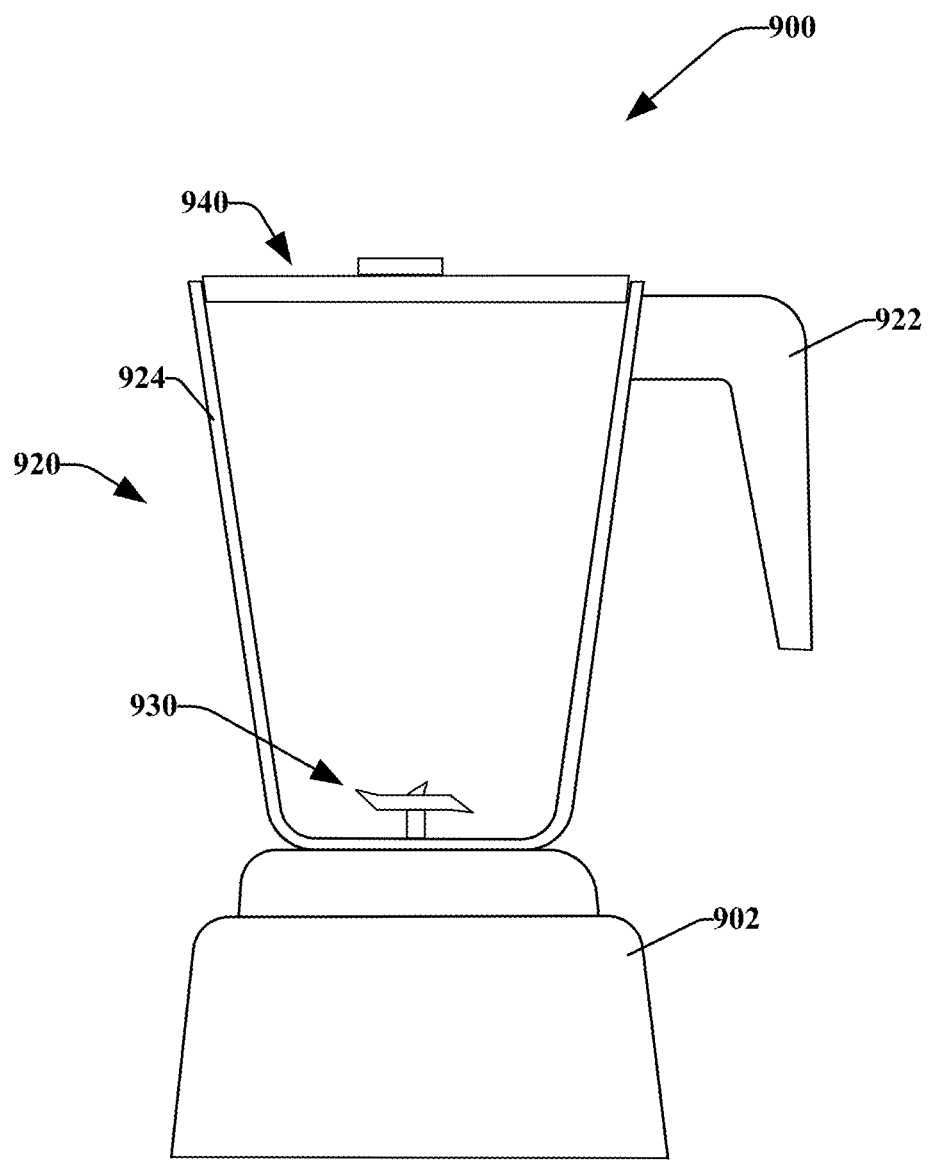
FIG. 9 is a front view of a blending system in accordance with various disclosed aspects.

FIG. 9 illustrates an exemplary blending system 900 in accordance with various disclosed embodiments. System 900 may utilize various disclosed aspects. For instance, system 900 may include some or all portions of embodiments described with reference to FIGS. 1-8.

System 900 primarily includes a blender base 902, a container 920 operatively attachable to the blender base 902, a blade assembly 930, and a lid 940 that may be operatively attached to the container. The container 920 may include walls 924 and a handle 922. Foodstuff may be added to the container 920 for blending. It is noted that the container 920 may comprise various materials such as plastics, glass, metals, or the like. In another aspect, container 920 may be powered in any appropriate manner.

The blade assembly 930, container 920, and base 902 may removably or irremovably attach. The container 920 may be powered in any appropriate manner, such as disclosed in U.S. patent application Ser. No. 14/213,557, entitled Powered Blending Container, which is hereby incorporated by reference. While shown as a large-format system, system 900 may comprise a single serving style system, where the container is filled, a blender base is attached to the container, and then the container is inverted and placed on a base.

The base 902 includes a motor disposed within a housing. The motor selectively drives the blade assembly 930 (e.g., cutting blades, chopping blades, whipping blades, spiralizing blades, etc.). The blade assembly 930 may agitate, impart heat, or otherwise interact with contents within the container. Operation of the blender system 900 may impart heat into the contents within container 920.

In at least one embodiment, the blending system 900 may identify or detect whether the system 900 is interlocked through mechanical detection (e.g., push rods), user input, image recognition, magnetic detection (e.g., reed switches), electronic detection (e.g., inductive coils, a near field communication (NFC) component), or the like.

System 900 and processes described herein generally relate to blending or food-processing systems include a food-processing disc comprising one or more inductive coils. In another aspect, one or more of the disc and/or lid may comprise an NFC component that may interact with an NFC component of a blender base. The NFC component of the blender base may receive information regarding the type of the disc and may utilize the blender base may utilize the information to determine a blending process to be utilized by the system.

It is noted that the various embodiments described herein may include other components and/or functionality. It is further noted that while described embodiments refer to a blender or a blender system, various other systems may be utilized in view of the described embodiments. For example, embodiments may be utilized in food processor systems, mixing systems, hand-held blender systems, various other food preparation systems, and the like. As such, references to a blender, blender system, and the like, are understood to include food processor systems, and other mixing systems. Such systems generally include a blender base that may include a motor, a blade assembly, and a controller. Further, such systems may include a container, a display, a memory or a processor.

As used herein, the phrases "blending process," "blending program," and the like are used interchangeably unless context suggest otherwise or warrants a particular distinction among such terms. A blending process may comprise a series or sequence of blender settings and operations to be carried out by the system 900. In an aspect, a blending process may comprise at least one motor speed and at least one time interval for the given motor speed. For example, a blending process may comprise a series of blender motor speeds to operate the blender blade at the given speed, a series of time intervals corresponding to the given motor speeds, and other blender parameters and timing settings. The blending process may further include a ramp up speed that defines the amount of time the motor takes to reach its predetermined motor speed. The blending process may be stored on a memory and recalled by or communicated to the blending device.

The terms "component," "module," "system," "interface," "platform," "service," "framework," "connector," "controller," or the like are generally intended to refer to a computer-related entity. Such terms may refer to at least one of hardware, software, or software in execution. For example, a component may include a computer-process running on a processor, a processor, a device, a process, a computer thread, or the likes. In another aspect, such terms may include both an application running on a processor and a processor. Moreover, such terms may be localized to one computer and/or may be distributed across multiple computers.

What has been described above includes examples of the present specification. It is, of course, not possible to describe every conceivable combination of components or methodologies for purposes of describing the present specification, but one of ordinary skill in the art may recognize that many further combinations and permutations of the present specification are possible. Each of the components described above may be combined or added together in any permutation to define the blending system 100. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A blender system comprising:
    a blender comprising
        a base housing a motor;
        a container operatively attached with the base; and
        a blade assembly operatively attached to the container; and,
    a user device comprising an input device that operatively receives at least one parameter, wherein the at least one parameter is captured during the motor operation, wherein the at least one parameter comprises audio recorded of the motor during the motor operation, and wherein the user device generates a diagnostic for an operating error associated with the blender based at least in part on generating an audio fingerprint that represents the audio, and wherein the diagnosing the blending device further comprises comparing the generated audio fingerprint to reference audio fingerprints to determine whether the generated audio fingerprint matches at least one matched reference audio fingerprint and identifying the operating error based at least in part on the matched reference audio fingerprint.

2. The blender system of claim 1, wherein the blender further comprises at least one sensor that operatively senses the at least one parameter.

3. The blender system of claim 1, wherein the blender operatively transmits the at least one parameter to the user device.

4. The blender system of claim 1, wherein the at least one parameter further comprises at least one of a temperature during motor operation, run-time of the motor, blending program performed by the motor, or vibration information, and wherein the user device further identifies the operating error based at least in part on the matched reference audio fingerprint and at least one of the temperature during motor operation, run-time of the motor, blending program performed by the motor, or vibration information.

5. The blender system of claim 1, wherein the input device operatively receives at least one of ingredient information or weight information of ingredients and wherein the user device further generates the diagnostic for the operating error associated with the blender based on the at least one parameter and the at least one of ingredient information or weight information of ingredients.

6. The blender system of claim 1, wherein the user device adds the generated audio fingerprint to reference audio fingerprints in response to the generated audio fingerprint not matching any of the reference audio fingerprints.

7. The blender system of claim 1, wherein the input device operatively receives at least one of a user action or a blending parameter and associates the at least one of the user action or the blending parameter with the generated audio fingerprint.

8. The blender system of claim 1, wherein the user device further determines at least one matched reference audio fingerprint through filtering the reference audio fingerprints based on operating parameters of the blender system.

* * * * *